US006953091B2

(12) United States Patent
Volpert

(10) Patent No.: US 6,953,091 B2
(45) Date of Patent: Oct. 11, 2005

(54) CEMENTING COMPOSITIONS INCLUDING A DISPERSANT AGENT FOR CEMENTING OPERATION IN OIL WELLS

(75) Inventor: Edgar Volpert, Munich (DE)

(73) Assignee: Schlumberger Technology Corporation, Sugar Land, TX (US)

(*) Notice: Subject to any disclaimer, the term of this patent is extended or adjusted under 35 U.S.C. 154(b) by 204 days.

(21) Appl. No.: 10/381,191

(22) PCT Filed: Sep. 24, 2001

(86) PCT No.: PCT/EP01/11139
§ 371 (c)(1),
(2), (4) Date: Mar. 20, 2003

(87) PCT Pub. No.: WO02/26654
PCT Pub. Date: Apr. 4, 2002

(65) Prior Publication Data
US 2004/0035331 A1 Feb. 26, 2004

(30) Foreign Application Priority Data
Sep. 29, 2000 (EP) .......................................... 00203384

(51) Int. Cl.⁷ .............................................. E21B 33/13
(52) U.S. Cl. ....................... 166/293; 166/901; 106/709
(58) Field of Search ................................. 166/285, 292, 166/293, 901; 106/709

(56) References Cited

U.S. PATENT DOCUMENTS 6,312,515 B1 * 11/2001 Barlet-Gouedard et al. . 106/709

FOREIGN PATENT DOCUMENTS

| EP | 0271435 | * | 6/1988 |
| WO | WO-99/47468 | * | 9/1999 |

* cited by examiner

Primary Examiner—John Kreck
(74) Attorney, Agent, or Firm—Thomas O. Mitchell; Tim Curington; Robin Nava

(57) ABSTRACT

The invention concerns a cementing composition for cold zones cementing operations in an oil well or analogous, said composition comprising a aqueous fluid base, solid particles including cement particles, and a dispersing agent in solution in the aqueous fluid base, said dispersing agent having a comb-like structure composed of a graft copolymer, said graft copolymer being constituted by a backbone carrying grafted chains.

10 Claims, No Drawings

CEMENTING COMPOSITIONS INCLUDING A DISPERSANT AGENT FOR CEMENTING OPERATION IN OIL WELLS

The present invention relates to the technical field of cementing oil, gas, water, geothermal, or analogous wells. More precisely, the invention relates to cementing compositions suitable for cementing in cold zones.

The construction of an oil well is done by drilling subsequent sections until reaching the aimed reservoir zone. Each section is drilled while circulating a fluid which lubricates and transports the drill cuttings out of the hole. After drilling each section a metal tube called a casing is lowered down the hole and a cement slurry is pumped through this casing to be placed into the annulus that extends between the casing and the underground wall of the well.

The cementing aims at stabilizing the well and at isolating the different subterranean zones so as to control the flow of fluids present at different levels in the formations.

A cement slurry is a highly concentrated solution of solid particles. The aqueous base may be constituted by sea water or brine, and as a result the slurry includes all sorts of ionic species. Additionally, cement properties are adjusted by the addition of various organic and inorganic additives including viscosifiers, retarders, accelerators, anti-settling agents and fluid loss control additives in order to adapt the design of the cement slurry to the different parameters of the section, e.g. temperature, type of formation and well geometry.

All of these species including the cement are subject to interactions that affect the flow and deformation of the slurry in response to applied stresses, or in other words, the slurry rheology. Cement slurries are typical Non-Newtonian fluid, that is a flow threshold is often observed, thus impeding displacement at low speed, and giving rise to sudden irregularities of flow. The apparent viscosity of the slurry must be kept sufficiently low to avoid excessive friction pressures when pumping the slurry into the annulus. Moreover, pumping a thick fluid in the annulus bears the risk of exceeding the fracture pressure of the formation and would lead to strong losses of fluid. On the other hand, simply adding more liquid since the slurry density must balance that of fluid formation cannot decrease the slurry viscosity.

Therefore, dispersants are added which reduce the fluid viscosity. Commonly used dispersants are polymers like polynaphtalenesulfonate (PNS) and polymelaminesulfonate (PMS). These compounds are assumed to act by adsorbing onto the particles and disperse the slurry by electrostatical repulsion. In general, these additives have only a slight retardation effect on the set time of the cement and this effect is negligible at the temperatures generally encountered in an oil well (above 50° C.). However, there is a range of operations that are performed at lower temperatures (under 50° C.). This includes for example cementing close to the sea water bottom or close to the surface in deep water operations or permafrost areas.

In these cases accelerators are added to the cement slurry in order to achieve reasonable set times. Calcium chloride and sodium chloride are among the most efficient and most economic accelerators and therefore extensively used. However, addition of these substances to the slurry make it more difficult to disperse. For instance, whereas for fresh water slurries about 0.5% to 1.5% of PMS (by weight of cement or BWOC) is typically required to achieve proper dispersion, concentration as high as 4% BWOC may be required for slurries containing sodium chloride. More generally, the required concentration may be from 5 to 10 times higher than the concentration required with fresh water when using dispersants of the type mentioned above. This behavior is usually explained by the conformational change of the charged polymer with increasing ionic strength, i.e. screening of the anionic groups in the chain leading to contraction of the dispersant polymer.

A side effect of the increased concentration is an enhanced retardation effect through the dispersant. This makes it necessary to add a higher amount of accelerator, which will demand a further addition of dispersant and so on. Since the other admixtures and the cement parameters also effect the additive response, it is sometime impossible to design a slurry that exhibits both a good rheology and an acceptable setting time in cold environment.

A further drawback of these common dispersants is the strong increase of the slurry rheology that results from the cooling of the fluid. This problem occurs for instance when pumping the slurry from a rig floor into subterranean sections close to the sea bed: the slurry is prepared at sea level, at an ambient temperature for instance of 20 C and its temperature decreases as it flows; an increase of its rheology may thus lead to excessive friction pressures. To obviate this problem, adding higher amounts of dispersing agents is generally not suitable since it leads to over-dispersion and consequently to non stable slurries at mixing temperature. Additionally, higher concentration would further lengthen the set time of the cement.

The present invention aims therefore at providing a new cementing composition suitable for oil well slurries that does not exhibit the drawbacks of the compositions known of the art.

This aim is satisfied in the present invention a cementing composition for cold zones cementing operations in an oil well or analogous, said composition comprising an aqueous fluid base, solid particles including cement particles, and a dispersing agent in solution in the aqueous fluid base, said dispersing agent having a comb-like structure composed of a graft copolymer, said graft copolymer being constituted by a backbone carrying grafted chains.

In a preferred embodiment of the invention, the backbone is a polycarboxylic acid or a polyether chain and the grafted chains are composed of polymerised ethylenically unsaturated monomers. Preferably, said grafted chains are polyoxyethylene or polyoxyethylene/polypropylene chains.

The composition according to the invention is particularly advantageous because the structure of the dispersing agent shows no obvious retardation on the cement set time. Therefore, this composition is very useful to prepare slurries for zones down to 4° C. with very short set times which can not be achieved with classical dispersants. Actually, the slurry rheology is independent of the temperature. Thus, its fluidity remains constant when attaining colder zones as the rig floor, which avoids the increase of friction pressure in the annulus. Moreover, this composition has a very interesting economical aspect: in presence of salt, the dispersant concentrations are up to 5–10 times lower than with common dispersants of the type PMS or PNS or similar polyelectrolytes. Actually, when accelerators are required, this composition makes the concentration necessary to obtain a well dispersed slurry independent of the said addition of accelerators. Finally, the use of the comb-type dispersing agent does not lead to overdispersion of the slurry and can even help to reduce generation of free water.

Advantageously, the cementing composition further comprising an accelerator agent, said accelerator being of the type of a chloride salt.

The solid particles of the cementing composition of the invention may comprise a trimodal blend, said blend being constituted by:

Portland cement having a mean particle diameter lying in the range 20 microns ($\mu$m) to 50 $\mu$m;

microcement having a mean particle diameter lying in the range 0.5 $\mu$m to 5 $\mu$m; and microspheres having a mean size lying in the range 20 $\mu$m to 350 $\mu$m.

This composition is of low density and is suitable to avoid exceeding the fracture pressure of the formation, which could happen in operations of cementation of sections in deep water wells. Actually, close to the sea bed, the formations are particularly weak and temperatures are below 20° C. This composition further allows to have short set times at temperatures below 20–30° C.

Part or all of the cement particles may be constituted of microcement having an average particle diameter lying in the range of 4–5 microns. This composition, which cement has a higher surface area than a normal cement, is for example very interesting for squeezing casing leaks or fissured formations where a good fluid penetration is required.

In a preferred embodiment of the invention, the concentration of the dispersing agent is lying in the range of 0.5 g to 4 g of said dispersant per kilogram of cement particles (including cement or cement and microcement).

The cementing compositions according to the invention present such properties that make them suitable for cementing operations in cold zones like zones close to the sea water bottom or zones close to the surface in deep water operations or permafrost areas.

The following examples illustrate the invention without limiting its scope.

In the following are presented several examples illustrating by experimental data the numerous advantages of using a comb-type dispersant in an oil well slurry containing high amounts of salt.

Actually, it has now been found that the dispersion of a cement can be completely disconnected from the accelerator concentration when using dispersants with a comb like structure as described for example in patent WO99/47468 or EP0271435. These dispersants are composed of a backbone, which can be for example polycarboxylic acid (like polyacrylic acid) or a polyether chain. The backbone carries grafted chains, which are composed of polymerised ethylenically unsaturated monomers (for example polyoxyethylene or polyoxyethylene/polypropylene side chains).

The structure of the polymer can differ in the length and type of the backbone and the composition, number and length of the grafted chains.

For all tests a dispersant called Chrysofluid Premia100 (coded CP100 Chryso, France) has been used to study the behaviour of comb-type dispersants, the concentration of this dispersant is lying in the range of 0.5 g to 4 g per kilogram of cement (meaning cement or cement and microcement). Some tests have been performed with other dispersants of the same type (e.g. Advaflow from Grace (US), Eucoflow346 from Fosroc) and gave nearly identical results (Table 1 bis). Thus, the results are representative for the general behaviour of this type of dispersant (polycarboxylic polymers, esters with hydroxyl group-containing polyethers).

EXAMPLE 1

In Table 1 are shown the data for a slurry dispersed with different concentrations of either the comb-type dispersant CP100 or PNS. The slurry has been prepared with Gulf cement (a class G Portland cement sold by Dyckerhoff, Germany) at a density of 1.89 g/cm$^3$ (15.8 ppg, pound per gallon) and contains 0.03 gallons per sack of anti foam agent (AFA) (i.e., 0.03 US gallons (3.78 litres) per 42 kilogram sack, 0.1 gps=9 cm$^3$/kg of cement).

TABLE 1

| Dispersant (cm$^3$/kg of cement) | Slurry with CP100 | | | Slurry with PNS | | |
|---|---|---|---|---|---|---|
| | $\tau_y$ (lb$_f$/100 ft$^2$) | Viscosity (mPa · s) | Free Water (ml) | $\tau_y$ (lb$_f$/100 ft$^2$) | Viscosity (mPa.s) | Free Water (ml) |
| 0 | 38.6 | 33.9 | 4 | 38.6 | 33.9 | 4 |
| 0.9 | 22.0 | 43.1 | 4 | 31.3 | 39.2 | 5 |
| 1.8 | 12.6 | 36.5 | 4 | 28.9 | 38.9 | 4 |
| 2.7 | 3.2 | 27.9 | 3 | 26.1 | 36.3 | 4.5 |
| 3.6 | 2.4 | 22.7 | 3 | 5.3 | 31.2 | 5.5 |
| 4.5 | 1.2 | 18.8 | 2.5 | 2.6 | 26.4 | 12 |
| 5.4 | 1.0 | 17.9 | 0 | 0.7 | 22.5 | 14.5 |

Dispersion with the latter leads to a strong drop of the yield stress ($\tau_y$, given in lbf/100 ft$^2$ i.e. libraforce per 100 square feet, the conversion in Pascals is given by multiplying by 0.478803) and the plastic viscosity (in milliPascals second or centiPoises) over a relatively narrow concentration range. Parallely with the dispersion a large amount of free water is generated when slightly increasing the PNS concentration. In contrary, with the comb-type dispersant slurry viscosity decreases quite gradually. This has the advantage that errors in concentration do not lead to a drastic change in rheology. A further advantage is that free water disappears when the cement slurry is fully dispersed.

EXAMPLE 1 BIS

In Table 1 bis are shown the data for a slurry dispersed with different concentrations of either the comb-type dispersants Advaflow from Grace (US) or Eucoflow 346 from Fosroc. The slurry has been prepared in the same manner than in example 1.

| Slurry | A1 | A2 | A3 | A4 |
|---|---|---|---|---|
| PNS (cm$^3$/kg slurry) | 18 | — | — | — |
| Eucoflow 346 (cm$^3$/kg slurry) | | 1.8 | | |
| Advaflow (cm$^3$/kg slurry) | — | — | 1.8 | |
| CP100 (cm$^3$/kg slurry) | | | | 1.8 |
| AFA (cm$^3$/kg slurry) | 2.7 | 2.7 | 2.7 | 2.7 |
| CaCl$_2$ (% BWOC) | 2 | 2 | 2 | 2 |
| Density (g/cm$^3$) | 1.89 | 1.89 | 1.89 | 1.89 |

-continued

| Slurry | A1 | A2 | A3 | A4 |
|---|---|---|---|---|
| Rheology 25 C. | | | | |
| $\tau_y$ (lb$_f$/100 ft$^2$) | 2.6 | 7 | 7 | 2 |
| Viscosity (mPa · s) | 22 | 23 | 20 | 21 |
| Thickening Time 10° C. | | | | |
| 10° C. | 12H30 | 5H45 | 7H45 | 7H30 |

These tests thus show that the result are approximately the same than the one on example 1 and are consequently representative of these comb-type dispersants.

EXAMPLE 2

Five slurry recipes are shown in Table 2 containing either PNS or a comb-type dispersant for control of the fluid rheology. An undispersed slurry (A5) is shown for comparison. For each dispersant is shown a recipe with and without Calcium chloride (acting as accelerator).

TABLE 2

| Slurry | A1 | A2 | A3 | A4 | A5 |
|---|---|---|---|---|---|
| CP 100 (cm$^3$/kg slurry) | 2.25 | 2.25 | — | — | — |
| PNS (cm$^3$/kg slurry) | — | — | 3.6 | 27 | — |
| AFA (cm$^3$/kg slurry) | 2.7 | 2.7 | 2.7 | 2.7 | 2.7 |
| CaCl$_2$ (% BWOC) | 0 | 2 | 0 | 2 | 2 |
| Density (g/cm3) | 1.89 | 1.89 | 1.89 | 1.89 | 1.89 |
| Rheology 25° C. | | | | | |
| $\tau_y$ (lb$_f$/100 ft$^2$) | 0.5 | 0.6 | 5.3 | 1.2 | 26.3 |
| Viscosity (mPa · s) | 39.3 | 38.2 | 31.2 | 35.6 | 37.8 |
| Rheology 10° C. | | | | | |
| $\tau_y$ (lb$_f$/100 ft$^2$) | — | 0.2 | — | 3.3 | — |
| Viscosity (mPa · s) | — | 39.1 | — | 45.9 | — |
| Thickening Time | | | | | |
| 25° C. | 7H2O | 3H55 | 12H40 | 6H45 | 3H45 |
| 10° C. | — | 12H30 | — | 18H15 | — |
| Compressive Strength Development (UCA) at 10° C. | | | | | |
| 3.45 MPa | — | 17H10 | — | 26H | 18H00 |
| 24 H | — | 7.6 MPa | — | 2.7 MPa | 8.1 MPa |

In absence of the accelerator 2 times more dispersant is needed in case of PNS to achieve the same degree of dispersion as with CP100 (see slurries A1 and A3). Addition of CaCl$_2$ to the slurry dispersed with CP10 does not influence the rheology. In the slurry containing PNS, the dispersant concentration has to be raised by a factor 6 to achieve a similar rheology as in slurry A3. When the temperature is lowered to 10° C. the rheology of the slurry A2 remains constant while the PNS in the slurry A4 looses some of its efficiency. The time required to attain a compressive strength of 500 psi (pounds force per square inch) (i.e., 3.45 MPa) is measured at 10° C. Further, the compressive strength after 24 hours is measured (1 psi=6.894 kPascals). Values of 1100 psi (7.6 MPa), 390 psi (2.7 MPa) and 1180 psi (8.1 MPa) have respectively been measured for Slurries A2, A4, A5. Comparison of thickening time and compressive strength development data of the dispersed slurries containing CaCl$_2$ (A2 and A4) with the undispersed slurry (A5) shows that the comb-type dispersant has no significant impact on the set properties of the slurry. PNS is retarding the cement set significantly.

EXAMPLE 3

Most low temperature applications are cementing operations relatively close to the surface (i.e. in general <1500 m). Lightweight slurries (i.e. with densities below 1.68 g/cm$^3$-14 ppg) have to be used in general to avoid exceeding the fracture pressure of the formation. One example is the cementation of sections in deep water wells. Close to the sea bed formations are very weak and temperatures can be below 20° C. Cement slurries are needed which have a low density and develop sufficient compressive strength in a reasonable time at these low temperatures.

A usual extended lightweight slurry sets very slowly because of the high water content. In Table 3 is shown a slurry design based on a trimodal concept described in the Schlumberger French Patent FR-95 07010. This trimodal concept makes use of the difference in the size of solid particles to improve the slurry and cement properties. This principle allows to design lightweight slurries with a much higher solid content than a normal extended slurry.

The trimodal blend consists of cement (Gulf from Dyckerhoff, class G Portland cement having particles with a mean diameter lying in the range 20 microns ($\mu$m) to 50 $\mu$m), microcement (having a mean particle diameter lying in the range 0.5 $\mu$m to 5 $\mu$m) and microspheres (having a mean size lying in the range 20 $\mu$m to 350 $\mu$m, and a specific gravity of 0.7 g/cm$^3$). The goal of the design is to provide a slurry with a low density (1.49 g/cm$^3$-12.4 ppg) which shows short set times at temperatures below 20–30° C. The good setting performance of the system is achieved by the addition of the microcement (having a much higher surface area than normal cement) and CaCl$_2$. The slurry further comprises an anti gaz migration agent (GMA), preferably considering those low temperatures a fluid loss control agent comprising a micro-gel and a surfactant selected among the group consisting of polyvinylpyrrolidone, styryl phenol derivatives, N-alkyl pyrrolidones, with an alkyl chain of less than 12, alkoxylated alcohols, with an alkyl chain less or equal to 14 and water soluble copolymers of vinyl pyrrolidone syuch as vinyl acetate with a vinyl acetate content of less than 50%.

TABLE 3

| Slurry | B1 | B2 |
|---|---|---|
| Cement (% BVOB) | 35 | 35 |
| Microcement (% BVOB) | 10 | 10 |
| Microspheres (% BVOB) | 55 | 55 |
| CP100 (cm$^3$/kg blend) | 3.6 | — |
| PNS (cm$^3$/kg blend) | — | 27 |
| AFA (cm$^3$/kg blend) | 2.7 | 2.7 |
| CaCl$_2$ (% BWOB) | 1 | 1 |
| GMA (cm$^3$/kg blend) | 54 | 54 |
| Density (g/cm$^3$) | 1.49 | 1.49 |
| Rheology 25° C. | | |
| $\tau_y$ (lb$_f$/100 ft$^2$) | 7.0 | 17.2 |
| Viscosity (mPa · s) | 95.8 | 251.7 |
| Rheology 10° C. | | |
| $\tau_y$ (lb$_f$/100 ft$^2$) | 0.5 | 59.5 |
| Viscosity (mPa · s) | 164.3 | 507.9 |
| Rheology 4° C. | | |
| $\tau_y$ (lb$_f$/100 ft$^2$) | 0.5 | n.m. |
| Viscosity (mPa · s) | 194.0 | n.m. |
| Thickening Time | | |
| 25° C. | 3H10 | 8H40 |
| 10° C. | 4H30 | 13H15 |
| 4° C. | 5H10 | 16H30 |
| Compressive Strength | | |

TABLE 3-continued

| Slurry | B1 | B2 |
|---|---|---|
| Development (UCA) at 25° C. | | |
| 3.45 MPa | 4H40 | ? |
| MPa after 24 H | 24.9 | ? |
| Mpa after 48 H | 36.3 | ? |
| Compressive Strength Development (UCA) at 10° C. | | |
| 3.4 Mpa | 9H50 | 43H50 |
| MPa after 24 H | 15.2 | — |
| MPa after 48 H | 30.7 | 6.3 |
| Compressive Strength Development (UCA) at 4° C. | | |
| 3.4 Mpa | 21H10 | 47H20 |
| Mpa after 24 H | 4.1 | — |
| MPa after 48 H | 10.1 | 3.6 |

BVOB = By Volume Of Blend (sum of all solid particles including cement)
BWOC = By Weight Of Cement
UCA = Ultra Sonic Analyser (normalised measurement mean)

As can be seen in Table 3 the amount of dispersant for achieving good slurry dispersion is much higher in the case of PNS. In fact in slurry B2 a higher PNS concentration would be necessary to achieve a rheology as low as in the design B1. However, further increasing the PNS concentration led to a very strong retardation of the slurry leading to thickening times above 16 hours.

The results show that the comb-type dispersant allows to maintain pumpability when decreasing the temperature. The slurry B1 viscosifies somewhat when decreasing the temperature from 25 down to 4° C. This viscosity increase can be related in a big part to the raise of the viscosity of water at lower temperatures. In contrary, a reduction of temperature to 10° C. leads to a drastic thickening of the slurry dispersed with PNS. The rheology of the slurry B2 can be considered as being to thick for being pumpable in most applications. At 4° C. the rheology was not measurable with the used rheometer (Fann35).

The slurry B1 shows no excessive increase of thickening time when reducing the temperature from 25 to 4° C. A stronger impact of the temperature reduction is observed for the cement set. The compressive strengths after 24 hours and 48 hours have been measured. The compressive strength development becomes much slower, but 3.45 MPa (500 psi) still can be reached in less than one day even at the lowest temperature (500 psi is in general considered as the minimum strength at which drilling can be resumed). The compressive strength data for slurry B2 show the strong tendency of the PNS to retard the slurry. For this system about two days are needed to achieve a compressive strength of 3.45 MPa (500 psi).

EXAMPLE 4

In Table 4 is presented a slurry prepared with a mixture of approximately 20% of Portland microcement and 80% of Slag (average particle diameter lying in the range of 4–5 microns). This cement has a much higher surface area than a normal cement. Consequently, dispersion becomes more difficult. This type of slurries is for example very interesting for squeezing casing leaks or fissured formations where a good fluid penetration is required. The system contains a polymeric additive (FLC) that improves the ability to penetrate into small fissures (typically an additive that comprises a fluid loss control additive of a nature and concentration such that the API fluid loss of the composition is less 30 ml/30 min).

TABLE 4

| Microcement Slurry | C1 | C2 |
|---|---|---|
| CP100 (cm³/kg cement) | 9 | — |
| PNS (cm³/kg cement) | — | 18 |
| AFA (cm³/kg cement) | 4.5 | 4.5 |
| CaCl$_2$ (% BWOC) | 1 | 1 |
| FLC (cm³/kg cement) | 90 | 90 |
| Density (g/cm³) | 1.68 | 1.68 |
| Rheology 25° C. | | |
| $\tau_y$ (lb$_f$/100 ft²) | 1.0 | 27.4 |
| Viscosity (mPa · s) | 75.0 | 109.3 |
| Rheology 10° C. | | |
| $\tau_y$ (lb$_f$/100 ft²) | 0.5 | 60.5 |
| Viscosity (mPa · s) | 92.3 | 620.3 |
| Thickening Time | | |
| 25° C. | 5H20 | 14H30 |
| 10° C. | 9H40 | >24H |
| Compressive Strength Development (UCA) at 25° C. | | |
| 3.4 Mpa | 9H22 | 22H10 |
| Mpa after 24 H | 22.2 | 3.9 |
| Mpa after 48 H | 27.3 | 6.7 |
| Compressive Strength Development (UCA) at 10° C. | | |
| 3.14 MPa | 9H50 | n.a. |
| MPa after 24 H | 15.2 | n.a. |
| MPa after 48 H | 30.7 | n.a. |

The same observations are made as in examples 2 or 3. Dispersion with the comb-type dispersant is much more efficient than with PNS. The rheology of slurry C1 remains relatively stable when decreasing the temperature from 25 to 10° C. A strong thickening phenomenon is observed under the same conditions for the slurry dispersed with PNS. Also thickening time and compressive strength development stay in an acceptable range with the dispersant CP100. The set of the slurry is much slower in case of the slurry PNS. At 10° C. the thickening time exceeds 24 hours and therefore the development of compressive strength was not analysed.

What is claimed is:

1. A well cementing method comprising pumping into a well in a cold zone a cementing composition comprising an aqueous fluid base, solid particles including cement particles, and a dispersing agent in solution in the aqueous fluid base, the dispersing agent having a comb-like structure composed of a backbone, selected from the group consisting of polycarboxylic acid and polyether, carrying grafted chains of polymerized ethylenically unsaturated monomers, wherein said pumping step occurs at least partially through zones having a temperature ranging between 4° C. and 20° C.

2. The method of claim 1, wherein the grafted chains comprise polyoxyethylene chains.

3. The method of claim 1, wherein the grafted chains comprise polyoxyethylene/polypropylene chains.

4. The method of claim 1, wherein the cementing composition further comprises a chloride salt as an accelerator agent.

5. The method of claim 1, wherein the solid particles comprise a trimodal blend including:
   30% to 40% of Portland cement having a mean particle diameter lying in the range 20 μm to 50 μm;
   5% to 15% of microcement having a mean particle diameter lying in the range 0.5 μm to 5 μm; and 50% to 60% of microspheres having a mean size lying in the range 20 μm to 350 μm.

6. The method of claim 1, wherein the solid particles comprise a mixture of microcement, having a mean particle diameter lying in the range of 4–5 μm.

7. The method of claim 1, wherein the cementing composition comprises 0.5 to 4 g of dispersing agent per kilogram of cement.

8. The method of claim 1, wherein the well is located close to the sea bed.

9. The method of claim 1, wherein the well is located in deep water.

10. The method of claim 1, wherein the well is located in a permafrost area.

* * * * *